(12) United States Patent
Haight et al.

(10) Patent No.: US 8,564,935 B2
(45) Date of Patent: *Oct. 22, 2013

(54) HIGH ENERGY DENSITY STORAGE MATERIAL DEVICE USING NANOCHANNEL STRUCTURE

(71) Applicant: International Business Machines Corporation, Armonk, NY (US)

(72) Inventors: Richard A. Haight, Yorktown Heights, NY (US); Stephen M. Rossnagel, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/745,221

(22) Filed: Jan. 18, 2013

(65) Prior Publication Data

US 2013/0128413 A1 May 23, 2013

Related U.S. Application Data

(60) Continuation of application No. 13/559,095, filed on Jul. 26, 2012, now Pat. No. 8,390,987, which is a division of application No. 12/699,411, filed on Feb. 3, 2010, now Pat. No. 8,287,604.

(51) Int. Cl.
*H01G 9/00* (2006.01)

(52) U.S. Cl.
USPC .......................................................... 361/503

(58) Field of Classification Search
None
See application file for complete search history.

(56) References Cited

U.S. PATENT DOCUMENTS

2008/0180883 A1*  7/2008  Palusinski et al. ............. 361/524
2010/0147674 A1*  6/2010  Krivoshlykov ............. 204/157.4
2012/0293915 A1* 11/2012  Haight et al. ................. 361/502

OTHER PUBLICATIONS

Jessensky, O., et al. Self-Organized Formation of Hexagonal Pore Arrays in Anodic Alumina. Applied Physics Letters. vol. 72, No. 10. Mar. 1998. pp. 1173-1175.
Sklar, G., et al. Pulsed Electrodeposition Into AAO Templates for CVD Growth of Carbon Nanotube Arrays. Institute of Physics Publishing. Nanotechnology 16. Jan. 2005. pp. 1265-1271.

* cited by examiner

*Primary Examiner* — Seahvosh Nikmanesh
(74) *Attorney, Agent, or Firm* — Tutunjian & Bitetto, P.C.; Louis J. Percello

(57) ABSTRACT

A capacitor includes a plurality of nanochannels formed in a dielectric material. A conductive film is formed over interior surfaces of the nanochannels, and a charge barrier is formed over the conductive film. An electrolytic solution is disposed in the nanochannels. An electrode is coupled to the electrolytic solution in the nanochannels to form the capacitor.

10 Claims, 9 Drawing Sheets

HIGH ENERGY DENSITY STORAGE MATERIAL DEVICE USING NANOCHANNEL STRUCTURE

RELATED APPLICATION INFORMATION

This application is a Continuation application of U.S. patent application Ser. No. 13/559,095 filed on Jul. 26, 2012, now allowed, which is a Divisional application of U.S. Pat. No. 8,287,604 issued on Oct. 16, 2012, all incorporated herein by reference in their entirety.

BACKGROUND

1. Technical Field

The present invention relates to electrical storage devices, and more particularly to high energy storage devices using nanochannel structures.

2. Description of the Related Art

Energy storage is an important part of many industries. Taking presently available energy and making it useful at a different time has utility in portable device technology, automobiles, electrical circuits, etc. Energy storage generally occurs in several basic forms, which may include mechanical, chemical, electrical, electrostatic, etc.

Mechanical energy storage may include potential energy against gravity. For example, hydraulic power. However, for electrical or electronic applications two basic forms of stored energy are used. These include chemical and electrostatic.

The chemical cases include batteries, fuel cells, and other chemical separation approaches (e.g., separating water into hydrogen and oxygen which can be recombined later to generate heat). The electrostatic approach typically consists of charge storage in a capacitor, and the largest versions of these capacitors are known as ultra capacitors.

SUMMARY

A capacitor includes a plurality of nanochannels formed in a dielectric material. A conductive film is formed over interior surfaces of the nanochannels, and a charge barrier is formed over the conductive film. An electrolytic solution is disposed in the nanochannels. An electrode is coupled to the electrolytic solution in the nanochannels to form the capacitor.

A method for forming a capacitor includes processing an Aluminum film to form a dielectric material with nanochannels therein by using anodic aluminum oxidation (AAO). A first conductive film is deposited over interior surfaces of the nanochannels to form a first electrode, and a dielectric is formed over the first conductive film to form a capacitor dielectric. A second conductive film is formed over the dielectric of the nanochannels to form a second electrode. A field region is patterned to remove a portion of the second conductive film from the dielectric in the field region and to remove a portion of the dielectric form the first conductive film. A first electrode is connected to the first conductive film in the field region and a second electrode is connected to the second conductive film over the nanochannels to form the capacitor.

A capacitor includes a plurality of nanochannels formed in a dielectric material, a conductive film formed over interior surfaces of the nanochannels, an electrolytic solution disposed in the nanochannels, and a charge barrier region formed over the conductive film. An electrode is coupled to the electrolytic solution in the nanochannels to form the capacitor.

Another capacitor includes an anodic aluminum oxidized (AAO) film having a plurality of nanochannels formed therein, a conductive film formed over interior surfaces of the nanochannels, a dielectric formed over the conductive film, and an electrolytic solution disposed in the nanochannels. An electrode is coupled to the electrolytic solution in the nanochannels to form the capacitor.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
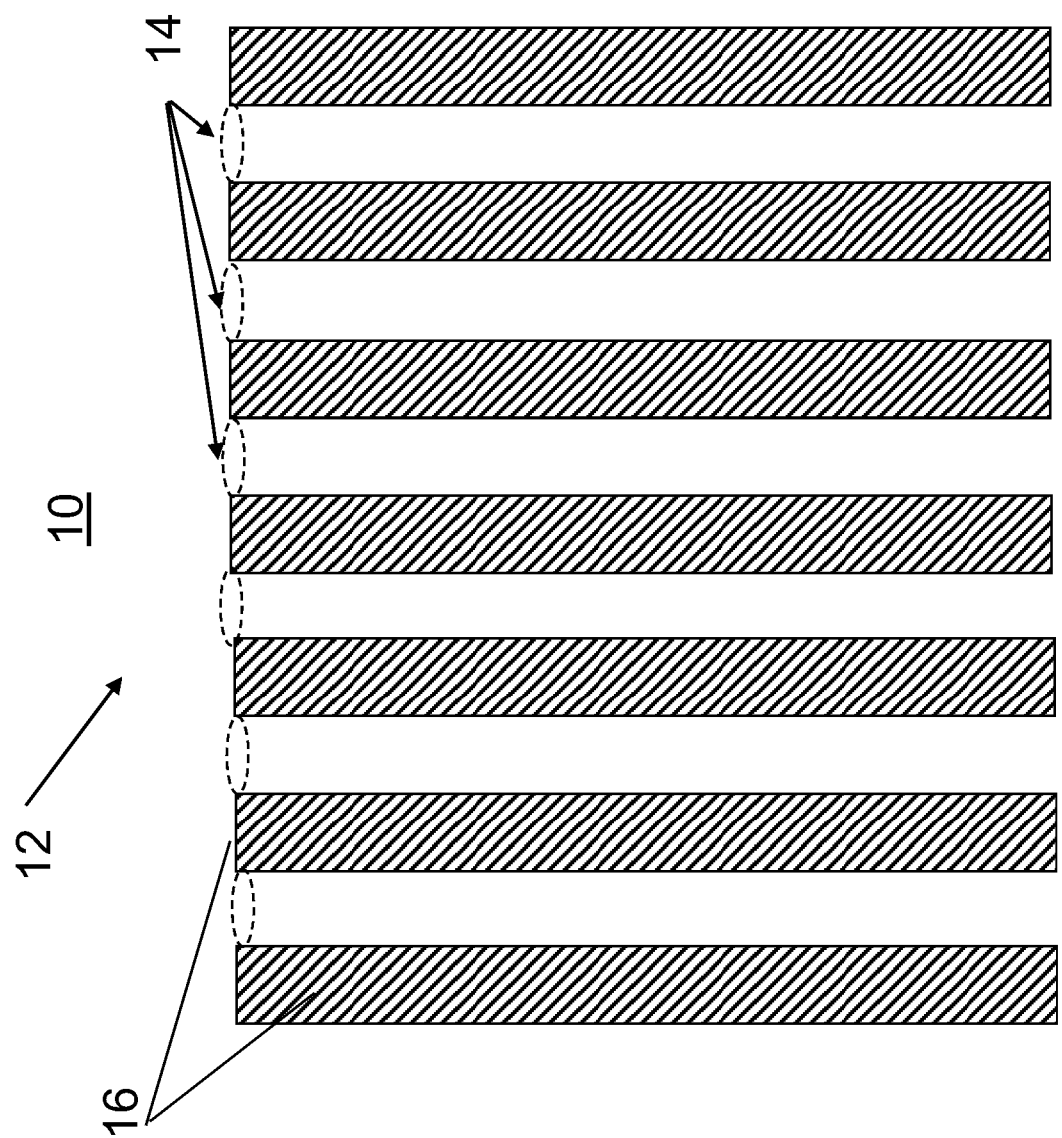
FIG. 1 is a cross-sectional view of a structure showing the formation of nanotubes or nanochannels through a membrane in accordance with one illustrative embodiment.

The present principles include methods and devices for high density storage. In a particularly useful embodiment, a device in accordance with the present principles takes the form of a capacitor. The device is based on electrostatic charge separation. The capacitor device is preferably constructed from an array of very small nanochannels. The nanochannels may be formed in an assembly of aluminum oxide, although other materials may also be employed.

The nanochannels may have diameters as small as about 10 nm, and a packing spacing of about 30 nm (i.e., 10 nm channels on a 30 nm pitch) and are formed in close-packed arrays. Other dimensions are also contemplated. The nanochannels extend deep into or through the Aluminum starting material, and can have lengths of several microns to 100 microns or more.

Embodiments in accordance with the present principles may include a coaxial capacitor formed in each of these nanochannels by the deposition of a conformal, thin metal film. A second electrode of the capacitor can be formed by the use of an electrolytic liquid which penetrates the nanochannels. If the molarity of the electrolyte is high enough (e.g., 1 M or higher), the self-shielding length of the electrolyte is 1 nm or less, the electrolyte will form a double layer within the nanochannel and hence store charge. To electrically connect this device, it is necessary to connect wires or leads to the metal film and the electrolyte.

In an alternate embodiment, a coaxial capacitor can be formed in each of these nanochannels by the deposition of a conformal, thin metal film followed by the deposition of a thin dielectric. A second electrode of the capacitor can be formed by the use of an electrolytic liquid which penetrates the nanochannels. To electrically connect this device, it is necessary to connect wires or leads to the metal film and the electrolyte. The second electrode may also be formed from an additional conductive deposition without the use of an electrolyte.

It is to be understood that the present invention will be described in terms of an illustrative architecture having a coaxial nanotube/nanochannel capacitance structures; however, other architectures, structures, substrate materials and process features and steps may be varied within the scope of the present invention.

The capacitors as described herein may be part of an electrical circuit. The circuit may be employed in electronic devices, integrated circuits, medical devices, etc. The circuit as described herein may be part of a design for an integrated circuit chip. The chip design may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Referring now to the drawings in which like numerals represent the same or similar elements and initially to FIG. 1, a dense array 12 of highly parallel nanochannels 14 are formed in an insulating substrate 16. In one embodiment, the array 12 is achieved using anodic oxidation of an Aluminum film under correct conditions. This process forms nanochannels 14 in aluminum foils (16) using anodic aluminum oxide (AAO) (See e.g., O. Jessensky et al., "Self-organized formation of hexagonal pore arrays in anodic alumina" Appl. Phys. Lett, 72, (1998) p1173, also G. Sklar et al, "Pulsed electodeposition into AAO templates for CVD growth of carbon nanotube arrays", Nanotechnology, 16 (2005) 1265-1271). This process forms high aspect ratio, parallel channels into Al by an anodic oxidation process. This process leads to the formation of channels 14 which have a diameter as low as 10 nm. The nanochannels 14 may include diameters of, e.g., between about 10 nm and about 200 nm. Other dimensions are also contemplated. The lengths of the nanochannels may be in the order of microns to tens of microns, e.g., 1 micron to 100 microns. Other sizes are also possible and may be employed depending on the application. A capacitor is formed from this structure 10 by depositing films on inside walls of the nanochannels 14, conformally covering them.

Figure 2:
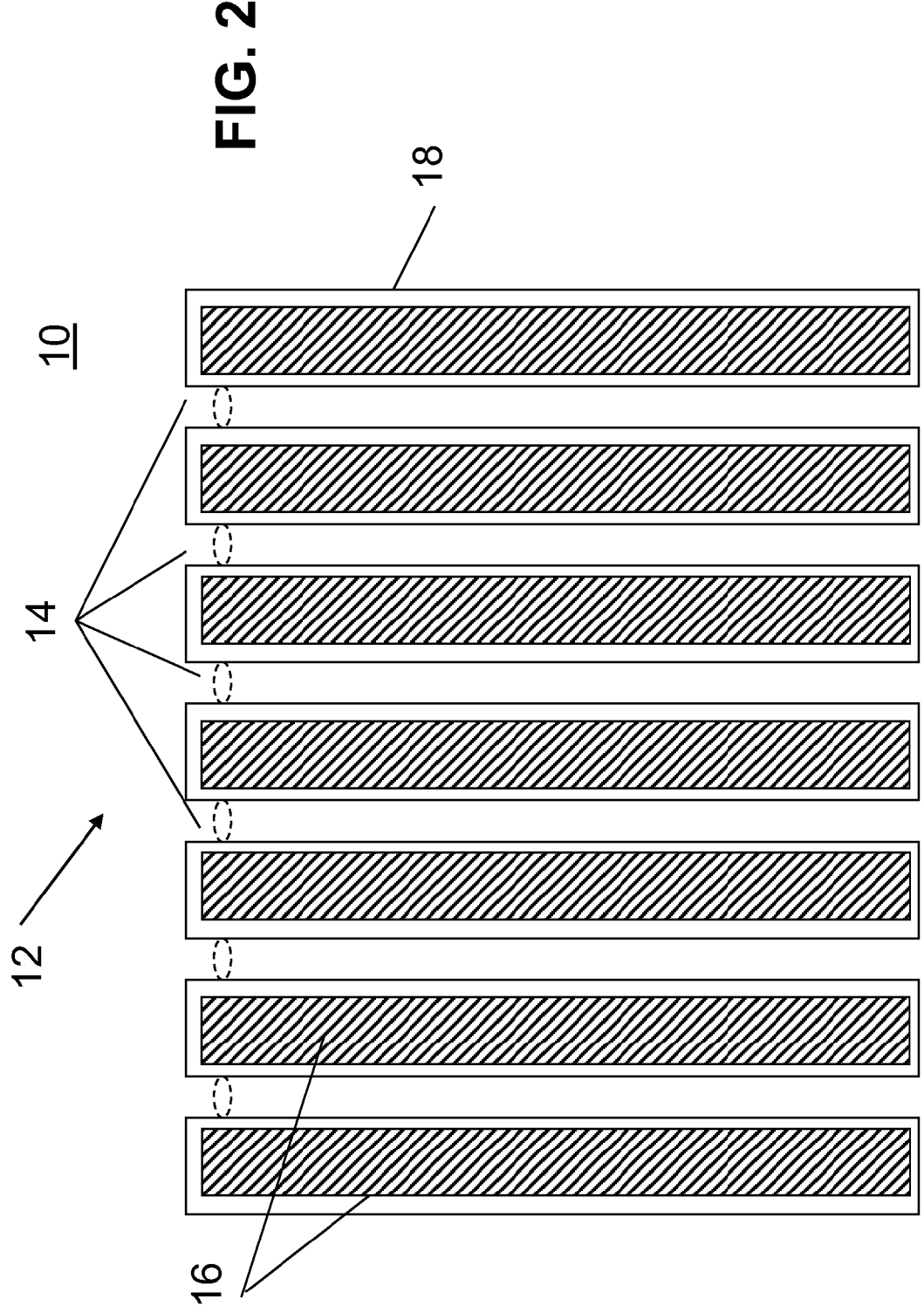
FIG. 2 is a cross-sectional view of the structure of FIG. 1 showing the formation of a conductive film in accordance with an illustrative embodiment.
Figure 3:
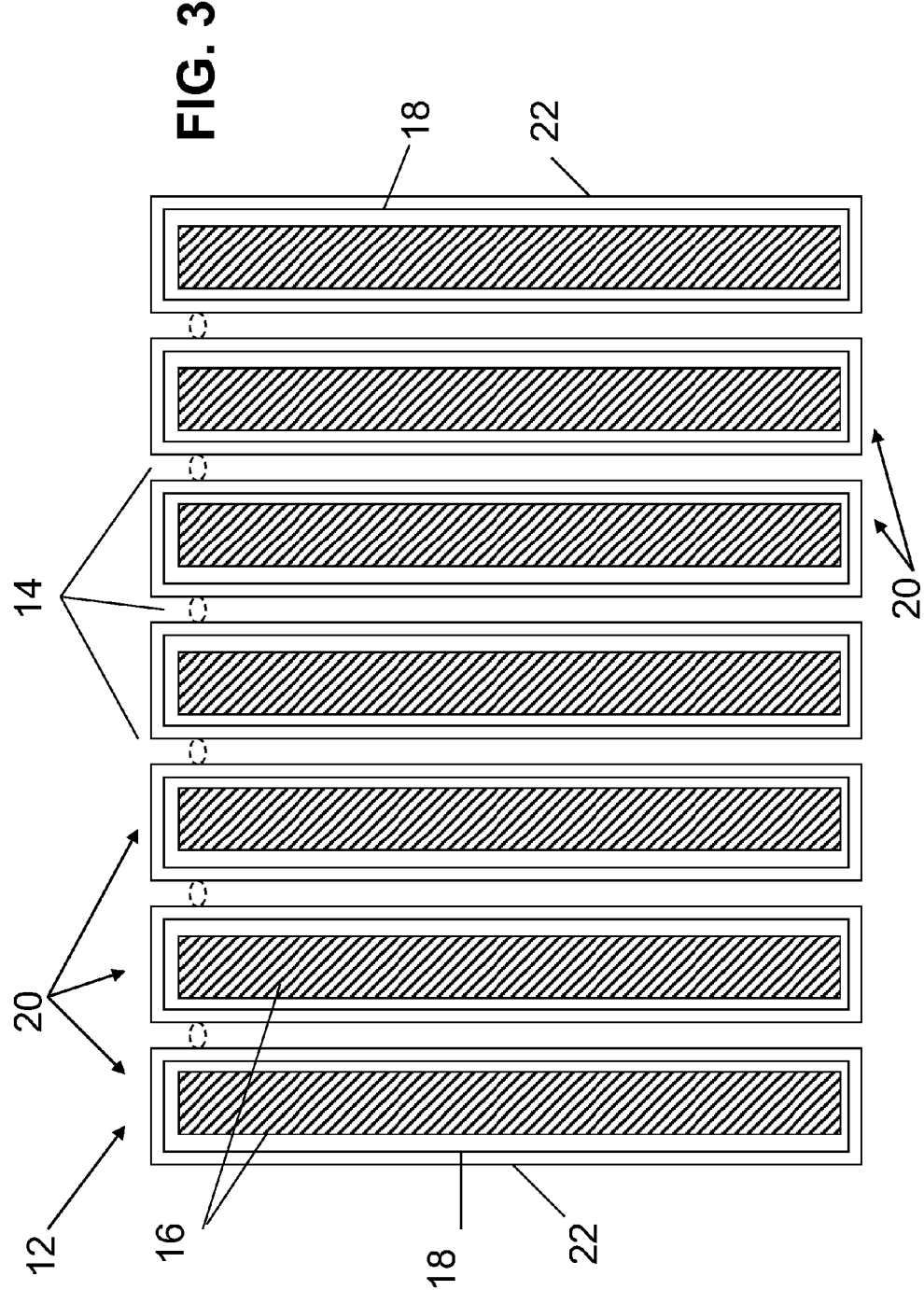
FIG. 3 is a cross-sectional view of the structure of FIG. 2 showing the formation of a dielectric in the nanochannels in accordance with another illustrative embodiment.

Referring to FIG. 2, a first electrode of the capacitor is formed by conformally depositing a material 18 on inside walls of the nanochannels 14. In one embodiment, Atomic Layer Deposition (ALD) may be employed, which is similar to Chemical Vapor Deposition (CVD), and either technique could be used depending on the aspect ratio (depth to diameter) of the nanochannels 14. In addition, a plating-like wet deposition process could also be used to deposit films on the sidewalls of the nanochannels 14. Since the AAO structure 16 is an insulator, the material 18 is deposited as a continuous metal film on all of the surfaces of the AAO 16; both the inner sidewalls of the nanochannels, and also in the flat areas on the top and bottom surfaces of the AAO structure 16—known as a field region 20 (FIG. 3). The field region 20 deposition will be employed in later steps for making electrical contact to the capacitor.

Figure 4:
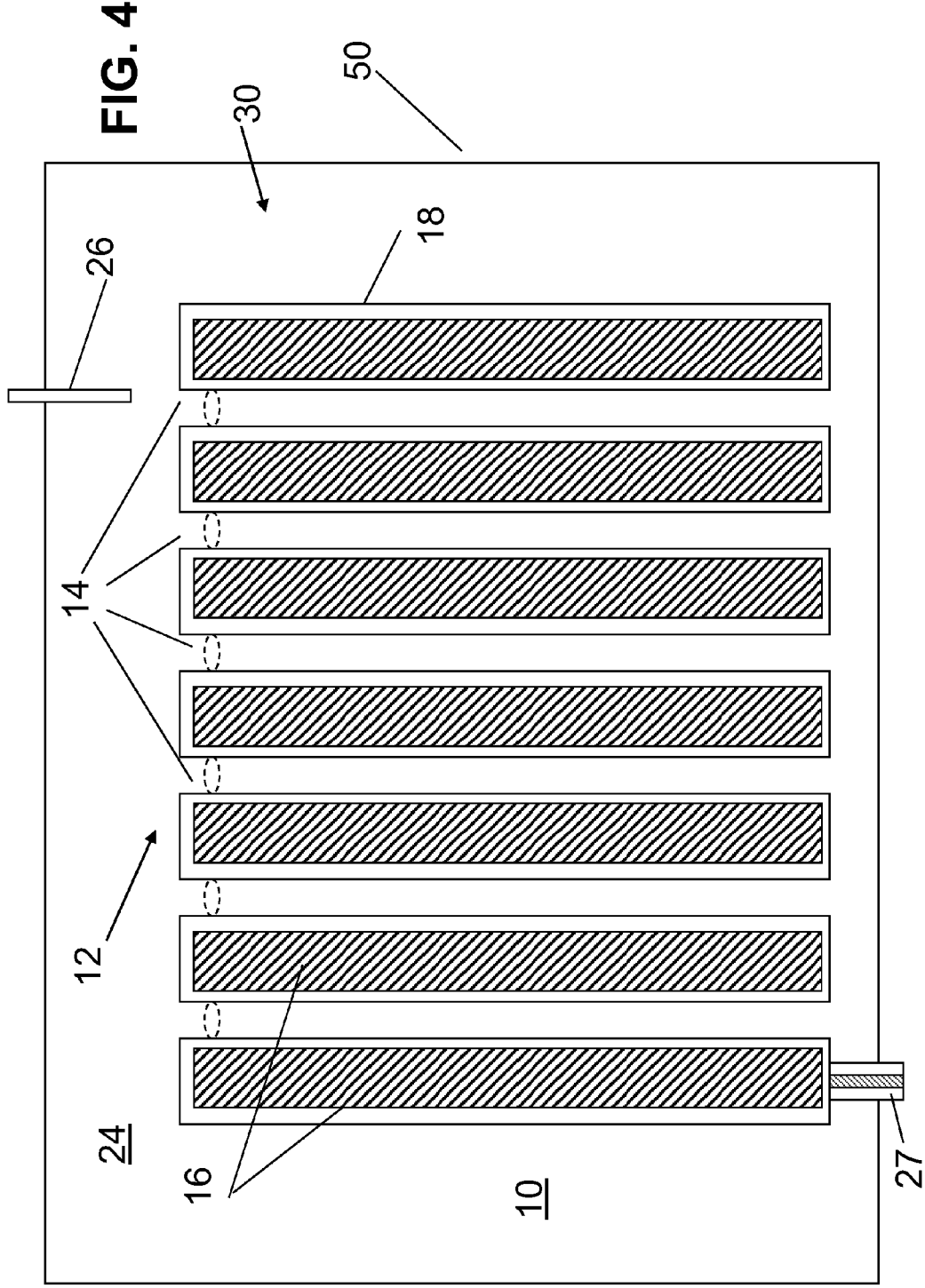
FIG. 4 is a cross-sectional view of the structure of FIG. 1 showing an electrolytic immersion to form a charge barrier and to form a second electrode in the nanochannels in accordance with another illustrative embodiment.

Material 18 is preferably a metal or other suitable conductive material. The film 18 needs to be electrically continuous, which for many metals using ALD means at least 1 nm thick. The metals employed may include copper, gold, silver, alloys of these and other metals, etc. The metal is preferably highly conductive and capable of ALD deposition. Thicker films of a few to a few tens of a nanometer are desired for lower resistivity. The electrical resistivity of this metal film 18 is preferably less than 1000 micro-ohm-cm for reasonable device performance (higher resistivity can work, but will be slow to charge). This metal-coated nanochannel structure will become a first electrode. A second electrode is formed by employing an electrolyte 24 (FIG. 4). The electrolyte 24 in this embodiment forms a double layer at the metal (18) surface to concurrently function as both the second electrode and a dielectric interface.

Due to the size of the device 10, free electrons in the metal disposed at the surface influence ions in the electrolyte 24 to form a double layer of attracted and repelled ions in the electrolyte. This double layer serves as a dielectric barrier between the metal 18 and the remaining portions of the electrolyte 24 (which remain conductive). This provides a capacitor structure in accordance with one embodiment.

Another embodiment in accordance with the present principles can be fabricated from the structure of FIG. 2, which has only the metal layer 18 and no dielectric layer 22. If an appropriate metal is chosen for layer 18, it is possible to use employ a phenomena known as pseudocapacitance to increase the net storage of the device 33. For example, metal layer 18 may include, e.g., Ru, Ni or Mn. For this effect, the surface of the metal 18 can be oxidized by the electrolyte 24 in the presence of an applied voltage. As an oxide surface, charge storage is increased as much as 10 times over the metal surface alone. The reaction is reversible as the voltage is reduced or reversed. A device using pseudocapacitance has significantly higher charge storage capability than with the metal layer 18 alone. The first metal layer 18 can undergo a simple reaction (such as oxidation) which can store electrical charge. This electrical charge provides a stronger "double layer" effect as described herein.

Referring to FIG. 3, taking the structure of FIG. 1, following the metal film 18 deposition, an insulating dielectric film 22 is formed on the metal film 18. This film 22 becomes a dielectric layer in the formation of a capacitor. This can be done by the deposition of the dielectric film 22, such as an oxide, a metal oxide, a nitride, such as silicon nitride, etc. In one embodiment, an aqueous oxidation of the surface of the metal film 18 is employed to form the dielectric film 22. This can be achieved if the oxidation does not reduce the entire metal film to a dielectric and that a sufficient amount of metal remains in film 18 to provide adequate conductivity.

A second electrode is formed by employing an electrolyte 24. The electrolyte 24 in this embodiment functions as the second electrode. In this embodiment, double layer formation of the electrolyte is not relied upon to form a capacitor dielectric.

Referring to FIG. 4, the structure of FIG. 2 forms a capacitor 30 by encasing the AAO 16 including the metal film 18 in the electrolyte 24. (This may be performed using an enclosure 50). The species of the electrolyte 24 may be any electrolyte having an appropriate conductivity. In one example, KOH, NaCl, most salt solutions, etc. may be employed as long as the electrolyte does not chemically alter the metal layer 18 of the structure. The electrolyte 24 may include a molarity high enough (e.g., >0.1 M) such that the DeBye length of the electrolyte is less than ½ the diameter of the resultant nanochannel with deposited films (nanochannel diameter minus twice the metal film 18 thickness). An electrical connection is made by inserting an electrode 26 into the electrolyte 24. This electrode 26 may include AgCl, although other species could be used which do not react with the electrolyte 24.

The enclosure 50 of the electrolyte is sealed about the region of the nanochannel capacitor device 30. It will be necessary for a wire contacting the electrolyte 24, as well as a wire 27 contacting the metal-covered nanochannel electrode (18), to emerge from the container 50 such that electrical contact can be made. Wire 27 is insulated as it passes through electrolyte 24 and through the double layer. Other configurations may also be employed.

Figure 5:
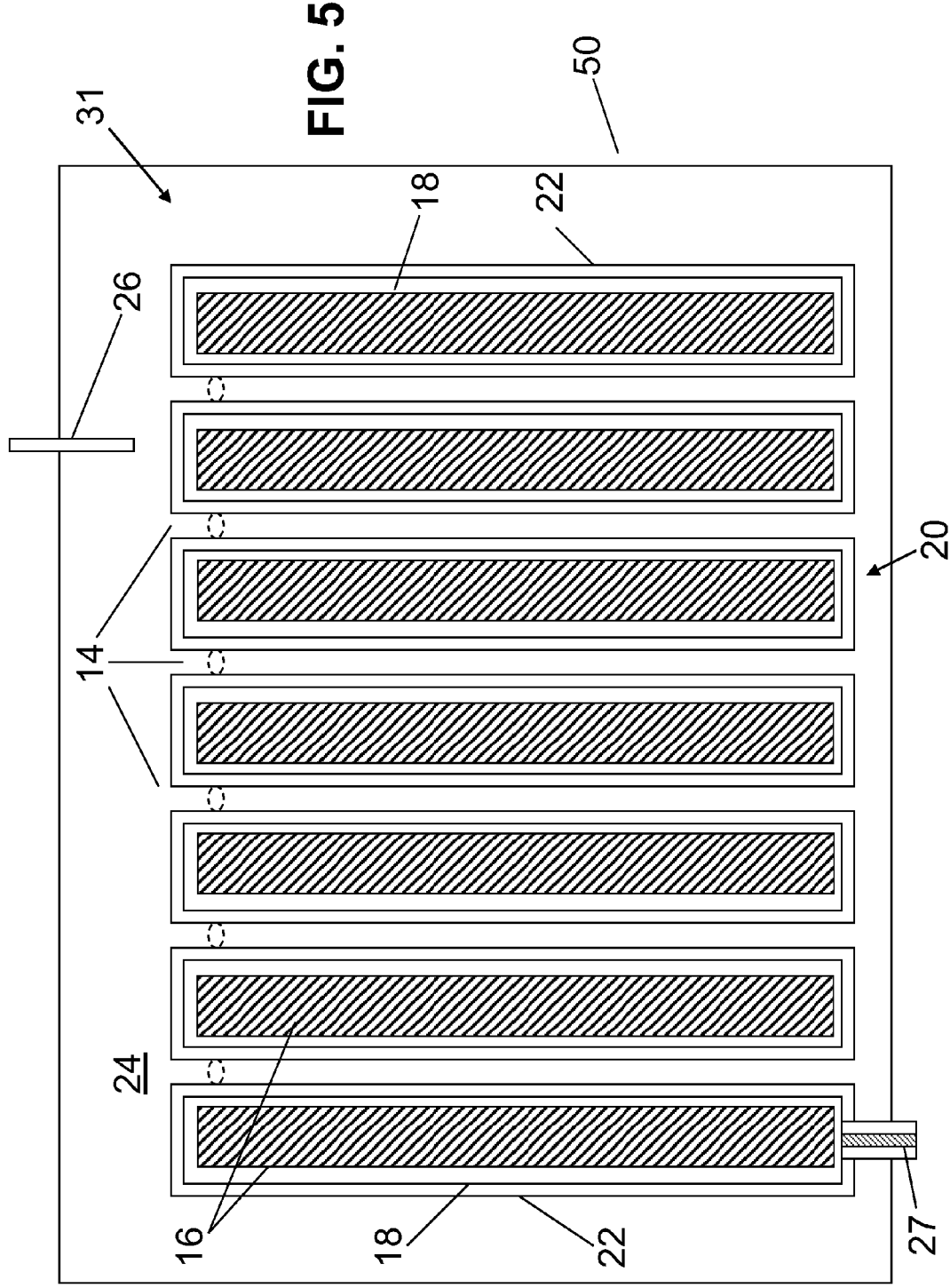
FIG. 5 is a cross-sectional view of the structure of FIG. 3 showing an electrolytic immersion to form a second electrode in the nanochannels in accordance with another illustrative embodiment.

Referring to FIG. 5, the structure of FIG. 3 forms a capacitor 31 by encasing the AAO 16 including the metal film 18 and dielectric film 22 in the electrolyte 24. (This may be performed using enclosure 50). The species of the electrolyte 24 may be any electrolyte having an appropriate conductivity. In one example, KOH, NaCl, most salt solutions, etc. may be employed as long as the electrolyte does not chemically alter the dielectric layer 22 on the metal layer 18 of the structure. The electrolyte 24 may include a molarity high enough (e.g., >0.1 M) such that the DeBye length of the electrolyte is less than ½ the diameter of the resultant nanochannel with deposited films (nanochannel diameter minus twice the metal film 18 thickness minus dielectric layer 22 thickness). An electrical connection is made by inserting an electrode 26 into the electrolyte 24. This electrode 26 may include AgCl, although other species could be used which do not react with the electrolyte 24.

The enclosure 50 of the electrolyte is sealed about the region of the nanochannel capacitor device 31. A wire or other connection 26 contacts the electrolyte 24, and a wire 27 contacts the metal-covered nanochannel electrode (18), to emerge from the container 50 such that electrical contact can be made. Wire 27 is insulated as it passes through electrolyte 24 and needs to pass through the dielectric layer 22 to contact metal 18.

Figure 6:
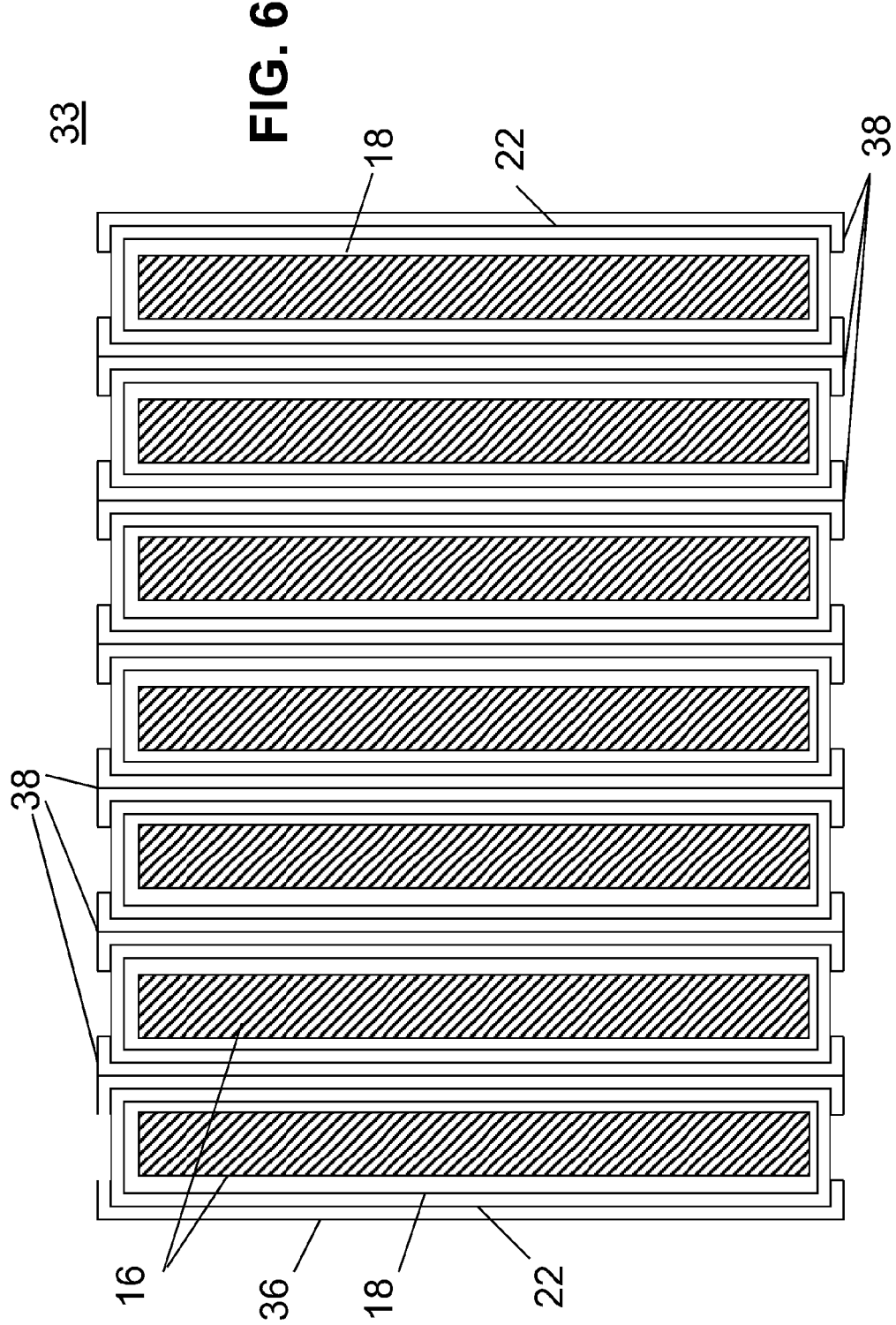
FIG. 6 is a cross-sectional view of the structure of FIG. 3 showing the formation of another conductive film to form a second electrode in the nanochannels in accordance with another illustrative embodiment.

Referring to FIG. 6, in accordance with an alternate embodiment, another patterned conformal conductive deposition 36 may be employed onto the dielectric layer 22 as depicted in FIG. 3 to form the second electrode of the capacitor 33. This deposition 36 is in place of using an electrolyte to form the second electrode. This may include employing ALD, CVD or a wet deposition process. It may be difficult to form this second electrode since the nanochannel 14 is filled with material 18 and dielectric 22. During the deposition, the conductive material 36 may fill the nanochannel and choke off the deposition process. Therefore, care needs to be taken to conformally coat the dielectric 22 sufficiently to ensure adequate conduction (e.g., 1 or more nanometers of conductor metal). The type of electrode selected (electrolyte or solid conductor) will depend on the processing parameters and dimensions. Since conductive deposition 36 will include the field region (20), an etch mask (not shown) may be formed and patterned to etch away portions of the conductive material 36. The deposition metal 36 may include material such as the metals described above. Etching of material 36 forms electrode connection points 38, which may be employed to connect to other circuitry.

Figure 7:
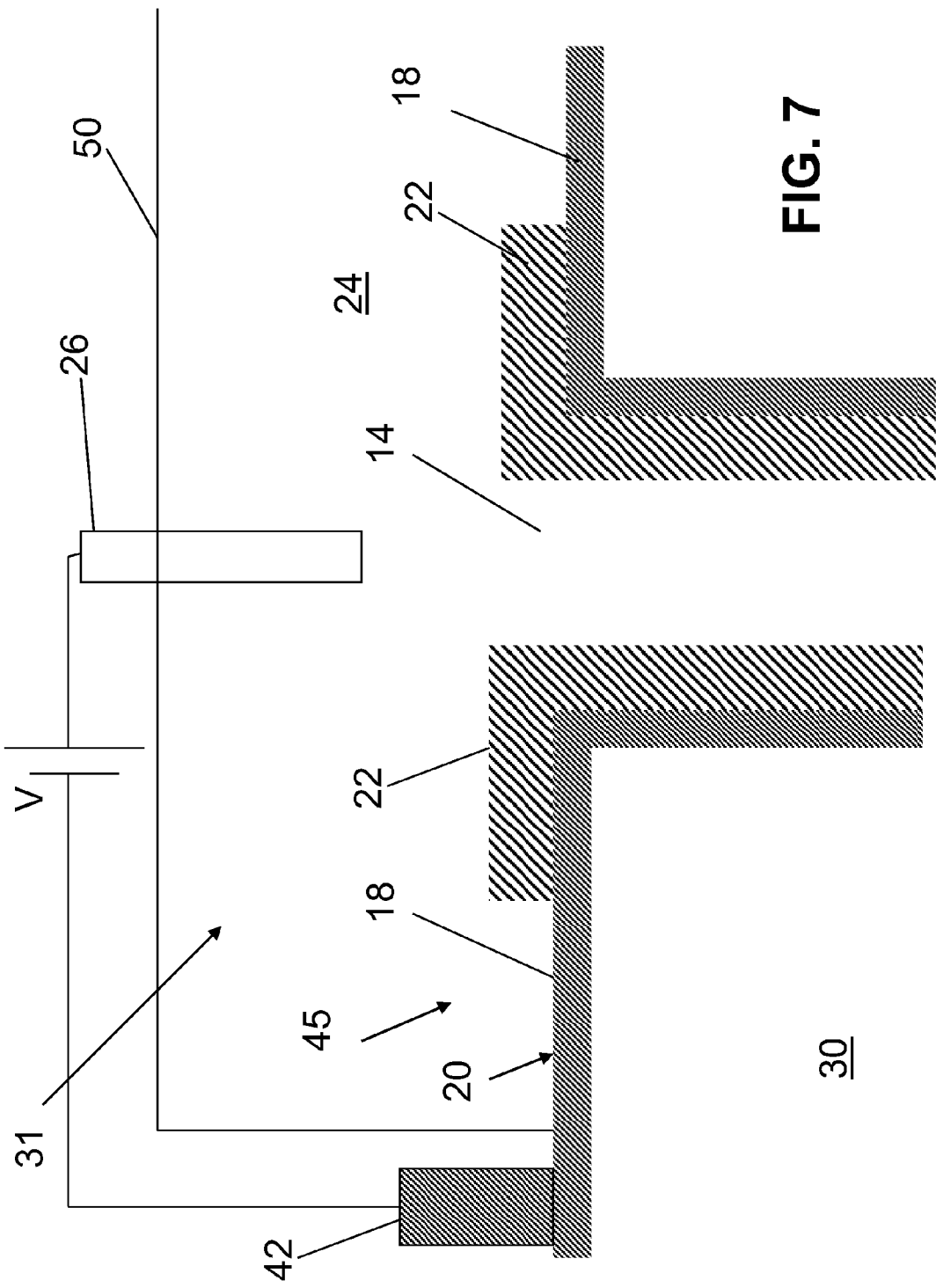
FIG. 7 is a cross-sectional view of the structure of FIG. 4 showing a capacitor formed in accordance with a liquid embodiment.

Referring to FIG. 7, the structure of FIG. 5 is shown in greater detail. The capacitor 31 now functions by making contact to the first, deposited metal layer 18. This can be most easily done on the field region 20 by chemically etching away the dielectric (second film) 22 in areas 45 to expose the metal 18. Other techniques could also be used. Film 18 may be connected to one electrode 42 of the capacitor 31. The second electrode is the electrode 26 in the electrolyte 24. By applying a voltage V across these two electrodes, charge will form on the metal film 18 as well as in a double layer in the electrolyte 24 inside the nanochannel 14. A surface charge (negative or positive) on film 18, causes charges in the electrolyte 24 to attract or repel ions and forms an electrical double layer. The thickness of this electrical double layer may be about 1 nm for electrolyte densities in the 1.0 M range.

The capacitance will be a function of the area of the surfaces within the nanochannels 14, the applied voltage (V), and the dielectric constant of the insulator (film 22). This can be calculated using known techniques. The capacitor 30 in accordance with the present principles is a device that can be used to electrostatically store charge in the form of a capacitor. The storage capacity if capacitor 31 greatly exceeds the storage capacity of previous capacitors. For example, standard ultracapacitors can achieve specific energy densities (energy/mass) of ~10 Wh/kg while we estimate that the increased surface area in accordance with the present embodiments could reach >100 Wh/kg.

If an electrolyte 24 is employed, the enclosure 50 may be formed around the capacitor 31 to maintain the electrolyte therein. The enclosure 50 may include a hollowed out layer in an integrated circuit structure that can be filled with the electrolyte upon completion of the circuit processing. The enclosure 50 may include an adhered polymer cavity affixed to a surface to which the AAO 16 is coupled. Other structures are also contemplated.

Figure 8:
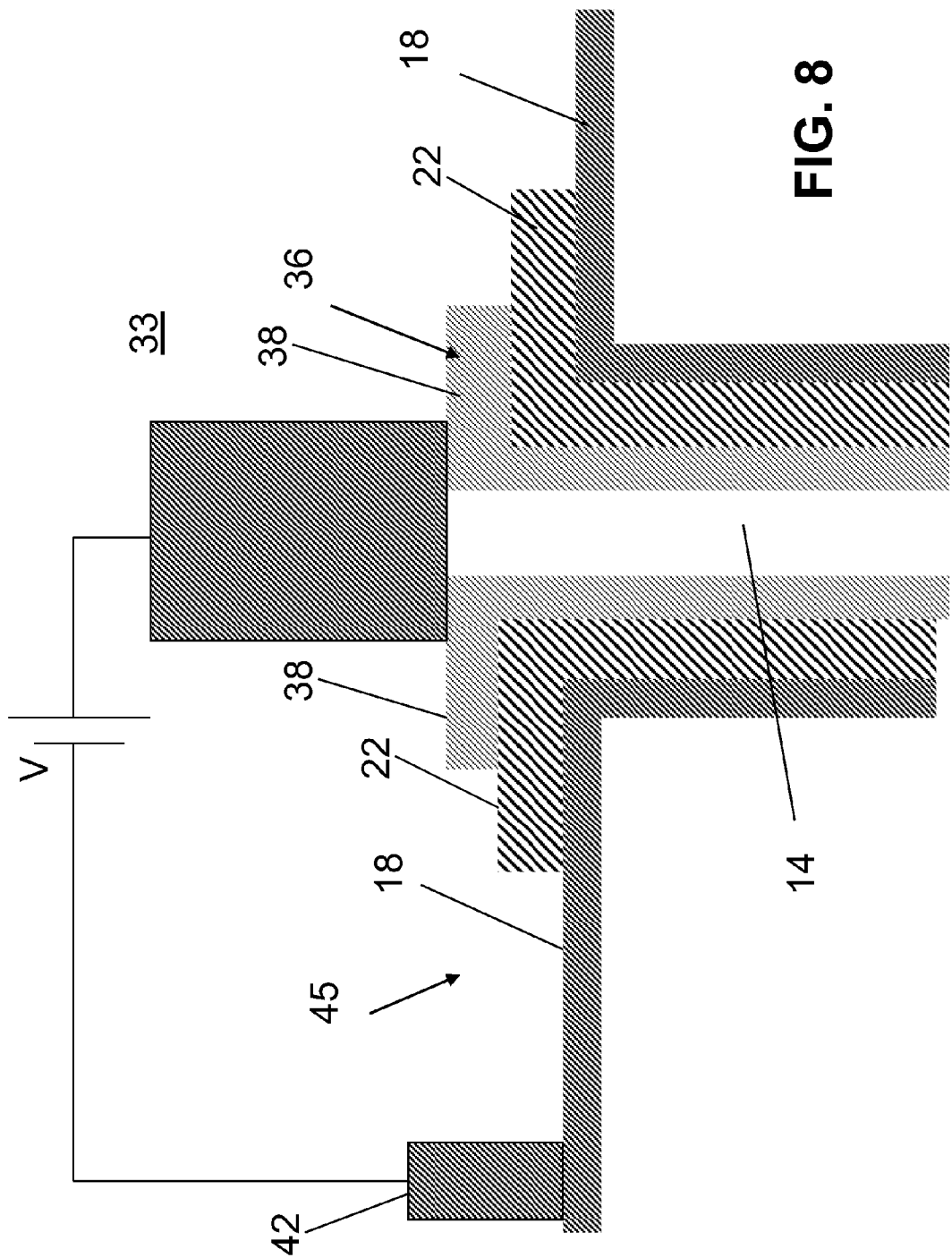
FIG. 8 is a is a cross-sectional view of the structure of FIG. 5 showing a capacitor formed in accordance with a solid embodiment.

Referring to FIG. 8, the structure of FIG. 6 is shown in greater detail. The capacitor 33 makes contact to the first, deposited metal layer 18. This can be most easily done in area 45 to expose the metal 18. Other techniques could also be used. Film 18 may be connected to one electrode 42 of the capacitor 31. A second electrode 40 connects to deposited material 36. This may be performed using lithographic patterning of material 36 followed by a deposition and patterning of an electrode layer to form electrode 40. By applying a voltage V across these two electrodes, charge will form on the metal film 18 and on layer 36 inside the nanochannel 14. The capacitance will be a function of the area of the surfaces within the nanochannels 14, the applied voltage (V), and the dielectric constant of the insulator (film 22). This can be calculated using known techniques. The capacitor 33 in accordance with the present principles is a device that can be used to electrostatically store charge. The storage capacity if capacitor 33 greatly exceeds the storage capacity of previous capacitors.

It should be understood that the sizes of a capacitor can be customized in accordance with different embodiments. For example, the metal film 18 and the conductive portion 38 can be patterned to permit connections to a subset of the nanotubes/nanochannels to form capacitors of different size in accordance with a group of nanochannels that provide a desired capacitance.

Figure 9:
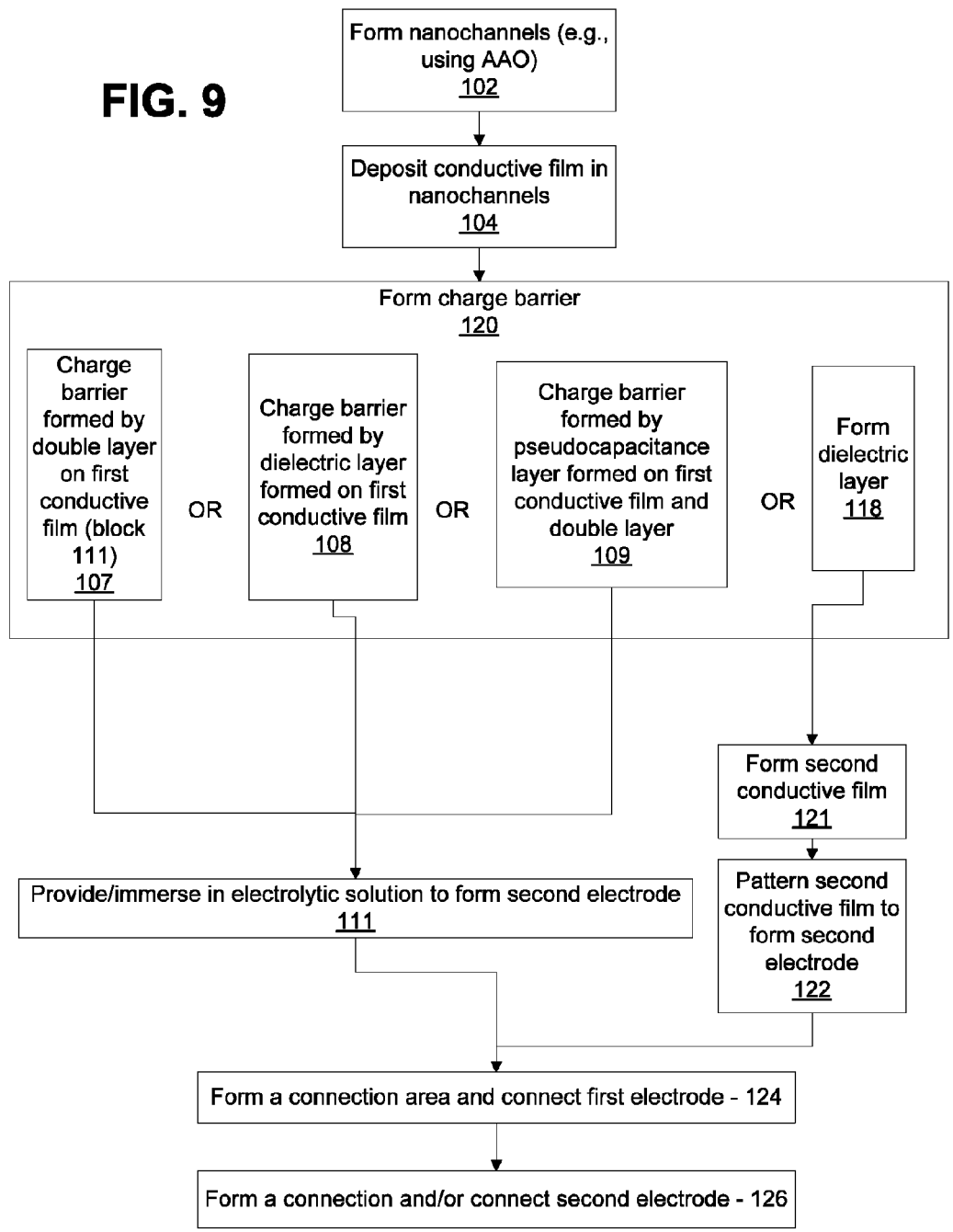
FIG. 9 is a flow chart showing a method for making a high density capacitor using nanochannels in accordance with the present principles.

Referring to FIG. 9, a flow chart shows an illustrative method for forming a capacitor in accordance with the present principles. In block 102, nanochannels are formed in a dielectric material. This preferably includes forming the processing an Aluminum film to form the nanochannels using anodic aluminum oxidation (AAO). The nanochannels preferably include a diameter of between about 20 nm and 200 nm. In block 104, a conductive film or metal layer is deposited over interior surfaces of the nanochannels. This may include employing one of ALD, CVD or a wet deposition process to deposit the conductive film.

In block 107, a charge barrier is formed over the conductive film. The charge barrier may include a double layer of an electrolytic solution in block 107, a deposited dielectric layer in block 108, and/or a pseudocapacitance layer (e.g., with a double layer) in block 109. The conductive film may be treated or oxidized to form the pseudocapacitance layer. If a dielectric film is deposited, the dielectric film may include one of an oxide, a metal oxide, and a nitride or performing an aqueous oxidation of the surface of the conductive film. The pseudocapitance layer may include an oxidized layer of the conductive film.

The process may split into one of a liquid embodiment and a solid embodiment. The liquid embodiment includes the use of an electrolytic solution and includes at least one of block 107, 108 and 109. The metal layer may be oxidized or treated to assist in the formation of the charge barrier. In block 111, an electrolytic solution is provided in the nanochannels in contact with the metal layer, the dielectric layer or the pseudocapacitance layer depending on the embodiment, and the nanochannels are immersed in the electrolytic solution. The electrolytic solution is in contact with the metal layer, dielectric layer or pseudocapacitance layer. The electrolytic solution forms a double layer in the presence of surface charge which further supports the construction of a charge barrier.

In the solid embodiment, a dielectric layer is formed over the first conductive film in block 118. In block 121, a second conductive film is deposited over the dielectric layer of the nanochannels to form a second electrode. The first conductive film forms the first electrode.

In block 122, an electrical connection area is prepared to make a connection to the second electrode for the solid embodiment. A field region may be patterned to remove a portion of the second conductive film from the dielectric layer in the field region. This may form a pad or connection point to the second electrode.

In block 124, a connection is made to the first electrode (first conductive film). In the embodiments with a dielectric layer over the first conductive film, this may include removing a portion of the dielectric from the first conductive film to expose a portion of the first conductive film in the field region. This exposed portion can be connected to a wire or conductor to provide an electrical connection to the first electrode. Where electrolytic solution sis employed, the connection may include an insulated wire connected to the field region.

In block 126, a second conductor is connected to the second electrode. This includes either a connection to the electrolytic solution (liquid embodiment) or a connection to the second conductive film (the solid embodiment) to form the capacitor.

Having described preferred embodiments of a high energy density storage material device and method using nanochannel structure (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A capacitor, comprising:
 a plurality of nanochannels formed through a layer;
 a conductive film formed over interior surfaces of the nanochannels to form a first capacitor plate;
 a charge barrier region formed over the conductive film; and
 an electrolytic solution disposed in the nanochannels to form a second capacitor plate.

2. The capacitor as recited in claim 1, wherein the nanochannels are formed in an anodic aluminum oxidized (AAO) film.

3. The capacitor as recited in claim 1, wherein the nanochannels include a diameter of between about 10 nm and 200 nm.

4. The capacitor as recited in claim 1, wherein the charge barrier includes a double layer formed in the electrolytic solution.

5. The capacitor as recited in claim 1, wherein the charge barrier includes a dielectric film.

6. The capacitor as recited in claim 5, wherein the dielectric film includes an aqueous oxidized portion of the conductive film.

7. The capacitor as recited in claim 1, further comprising an enclosure surrounding the nanochannels, the enclosure being configured to seal in the electrolytic solution.

8. The capacitor as recited in claim 1, wherein the charge barrier region includes a pseudocapacitance layer formed in the conductive layer.

9. The capacitor as recited in claim 1, further comprising an electrode coupled to the electrolytic solution in the nanochannels.

10. The capacitor as recited in claim 1, wherein the layer includes a dielectric material.

* * * * *